Feb. 5, 1946. P. J. McCARTHY 2,394,088
TOOL AND TOOL-SERVING MEANS FOR WORKING ON SEAMS BETWEEN PLANKS
Filed Feb. 8, 1943 9 Sheets-Sheet 4
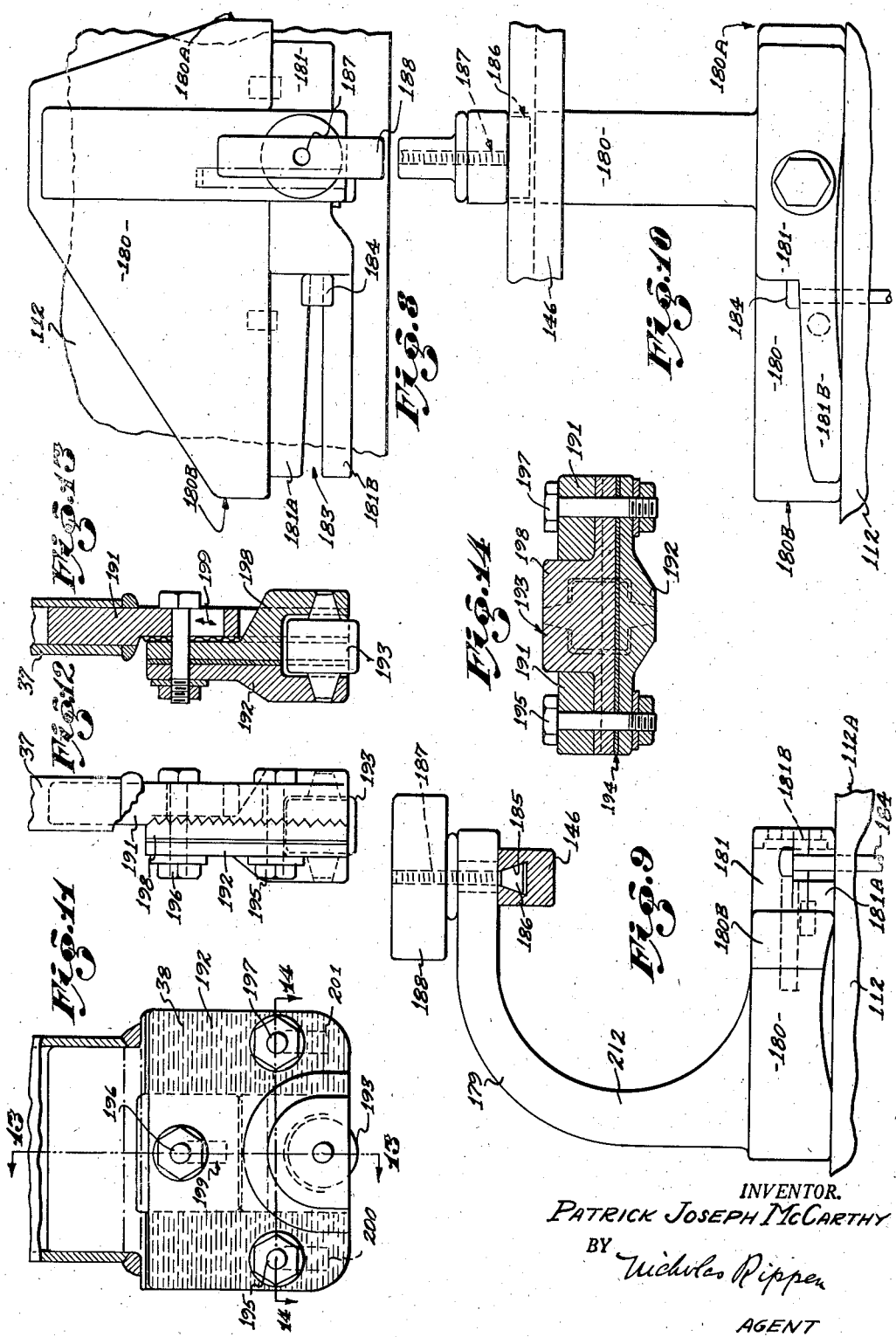
INVENTOR.
PATRICK JOSEPH McCARTHY
BY Nicholas Pippen
AGENT

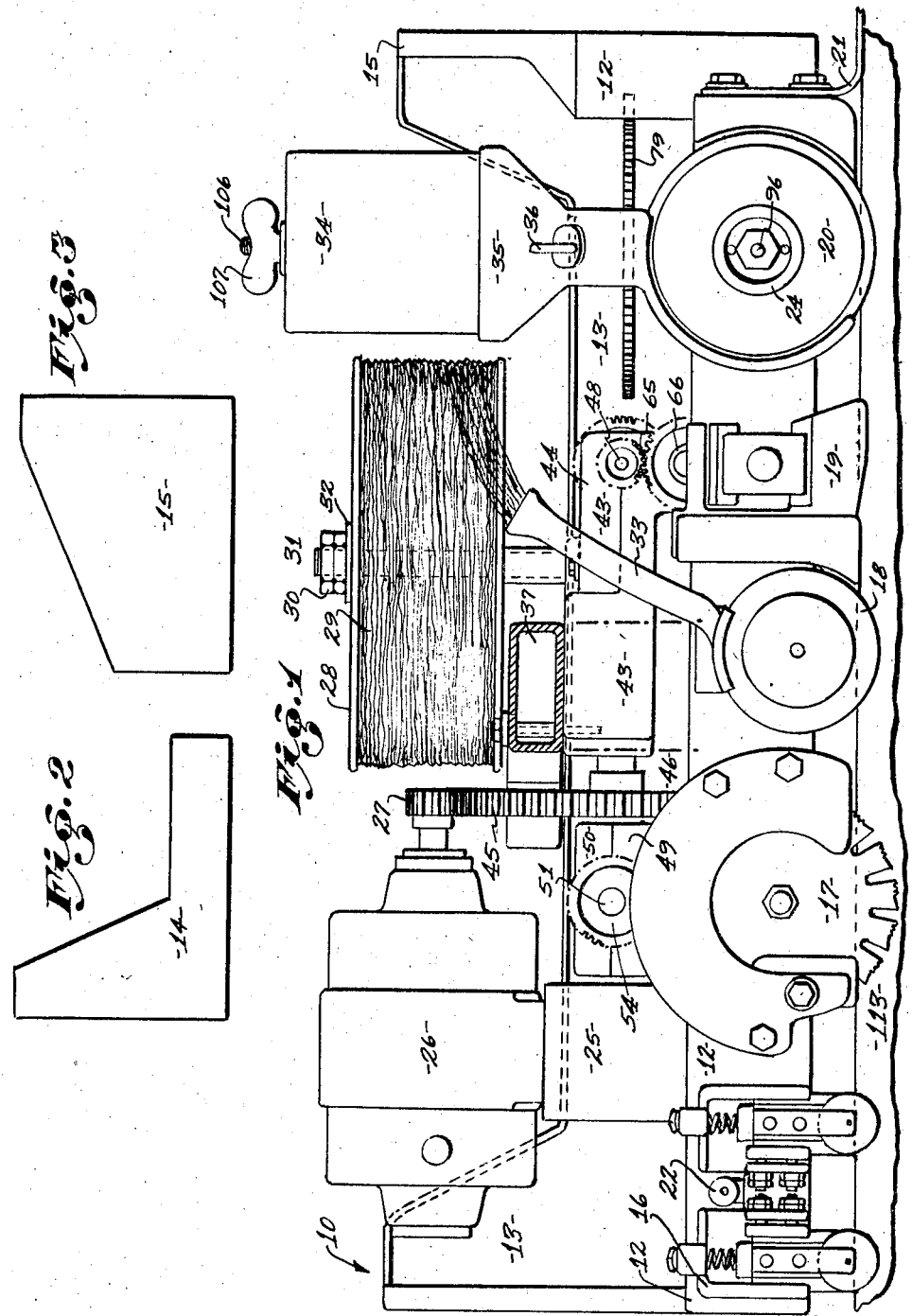

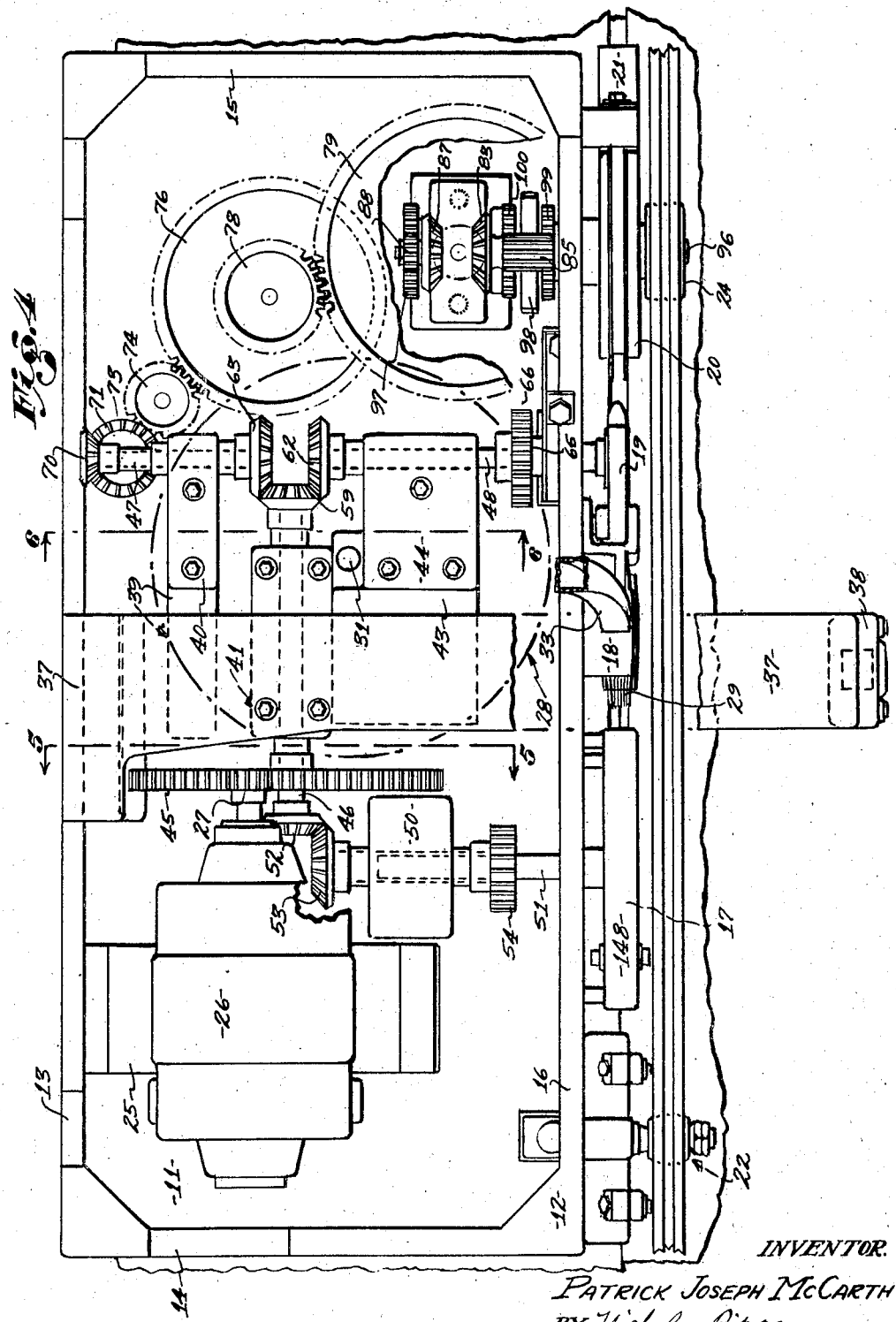

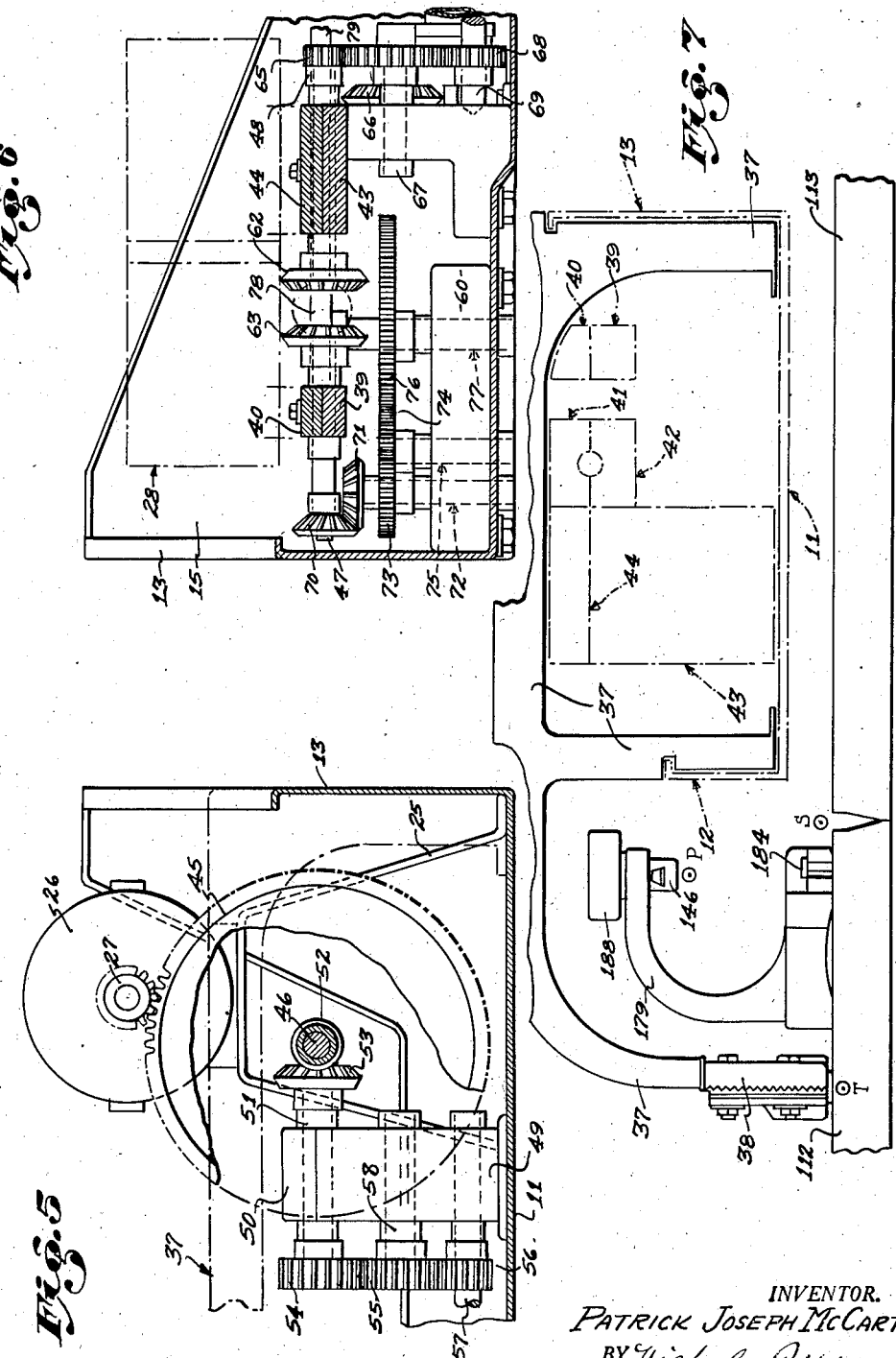

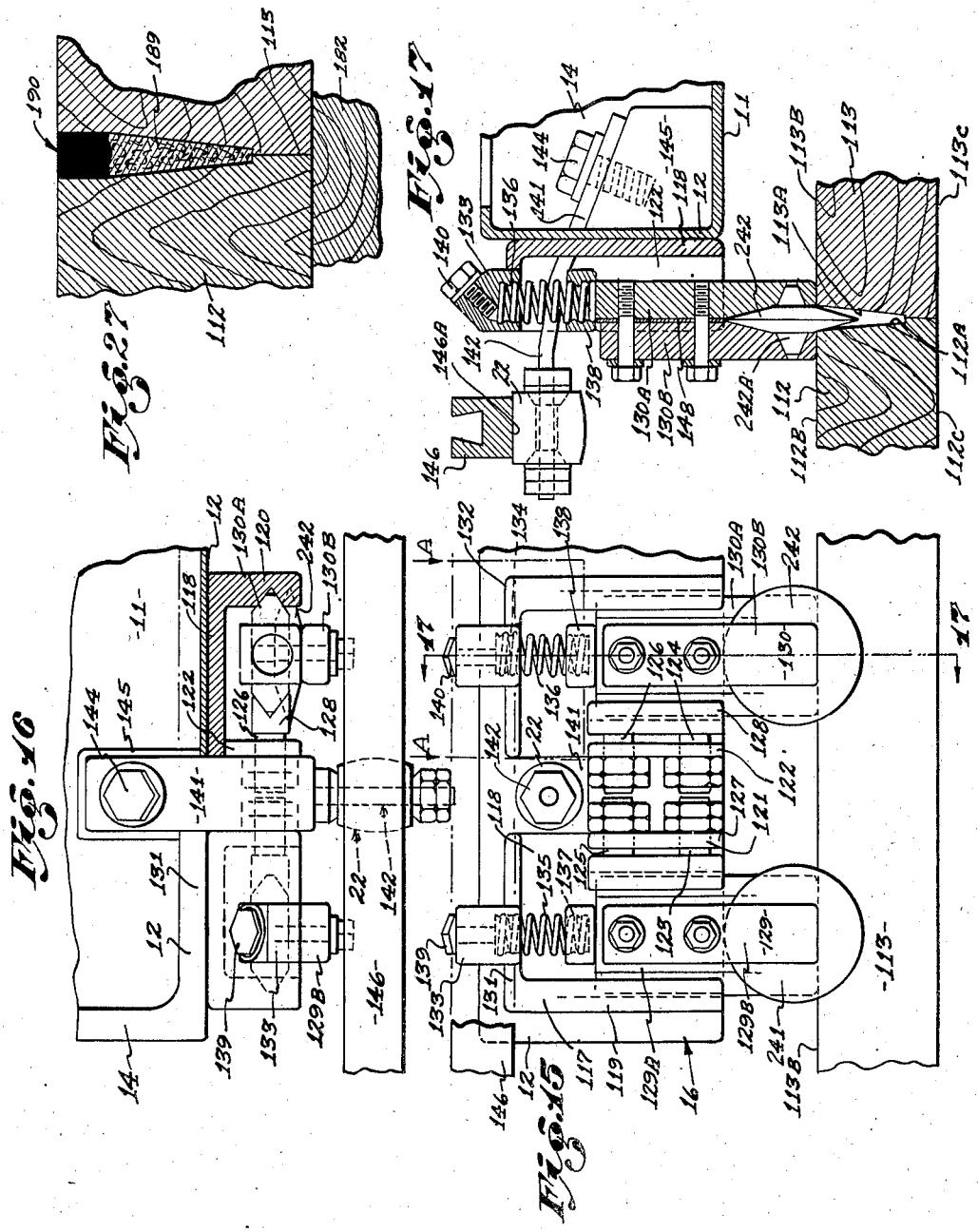

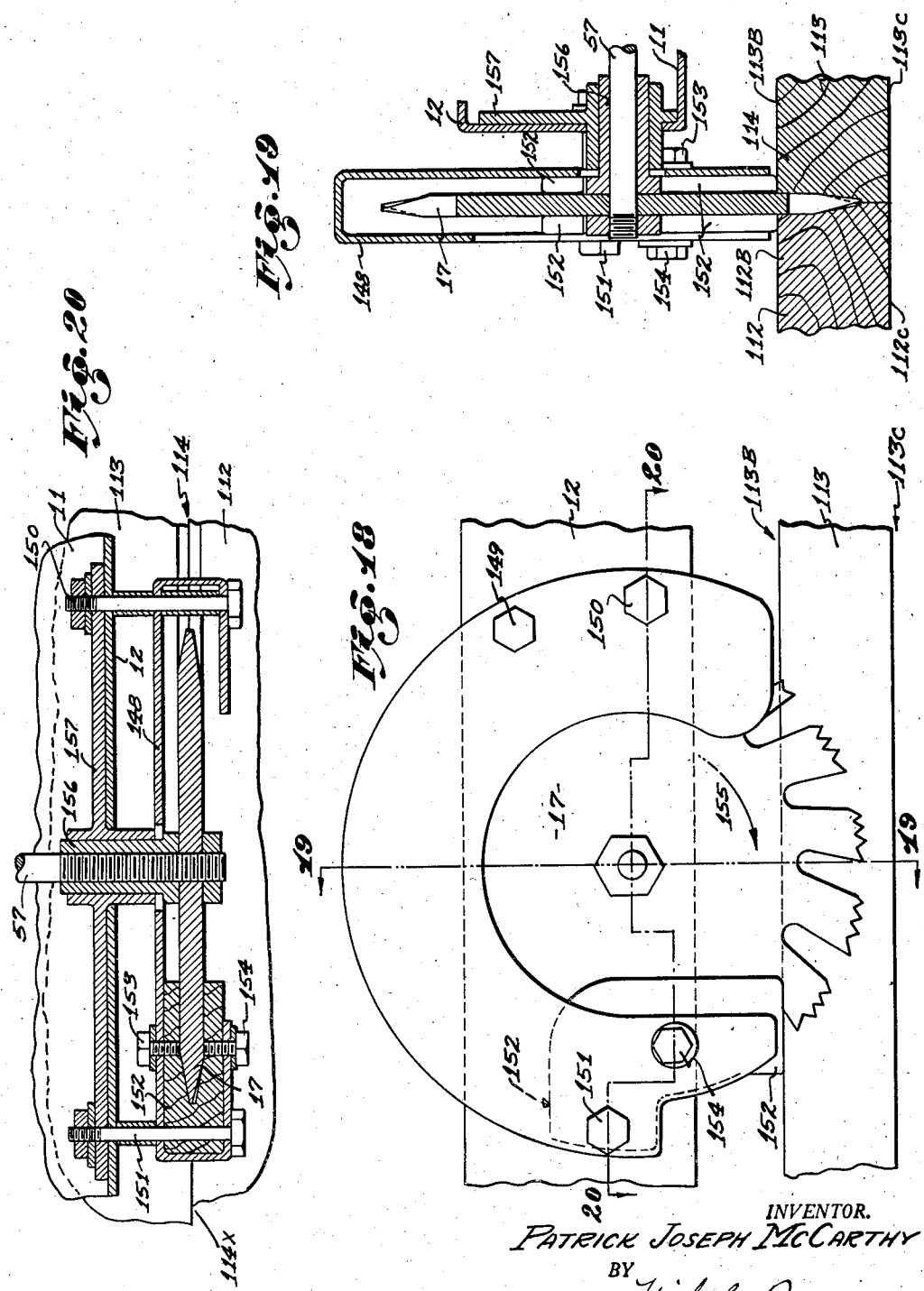

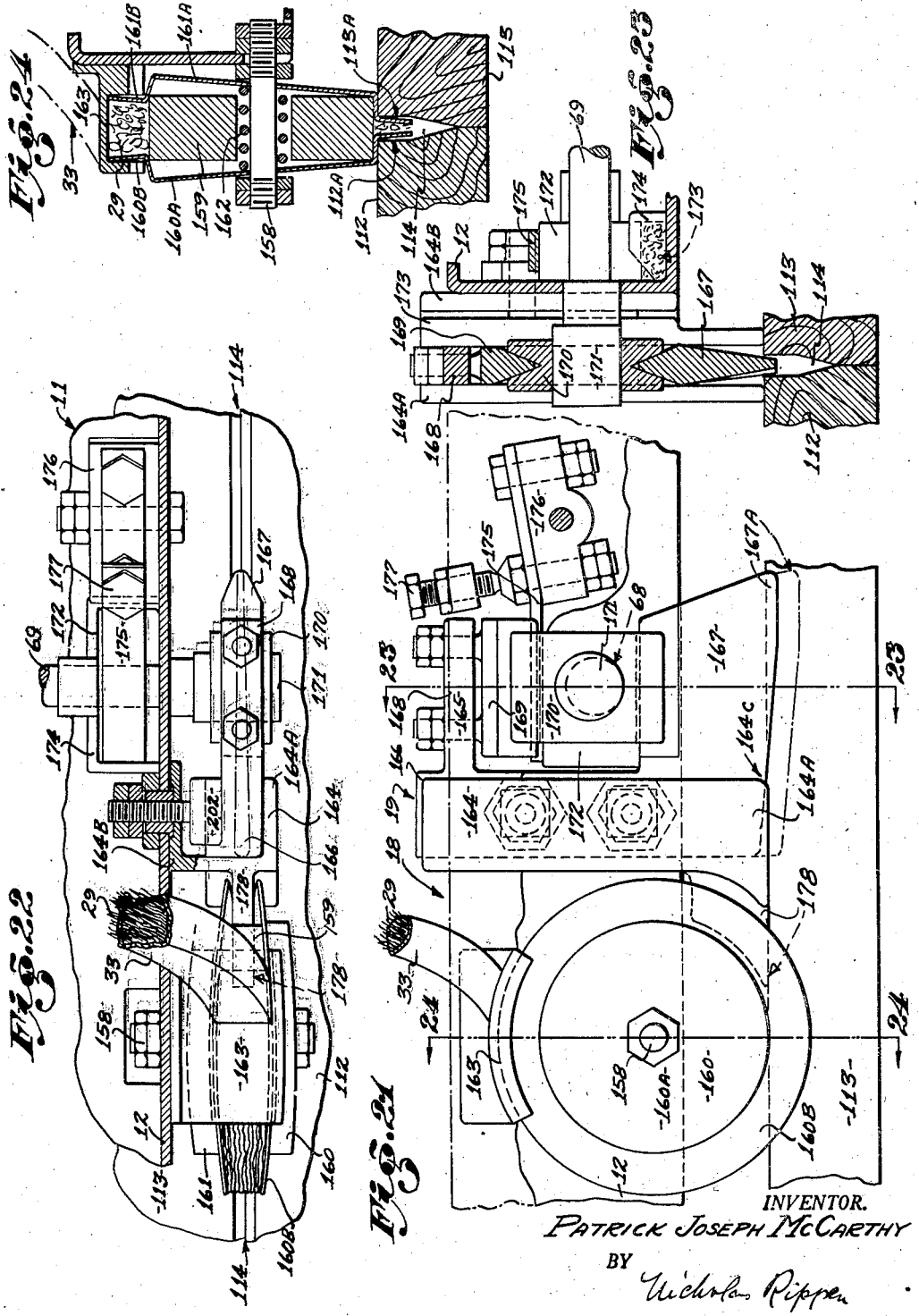

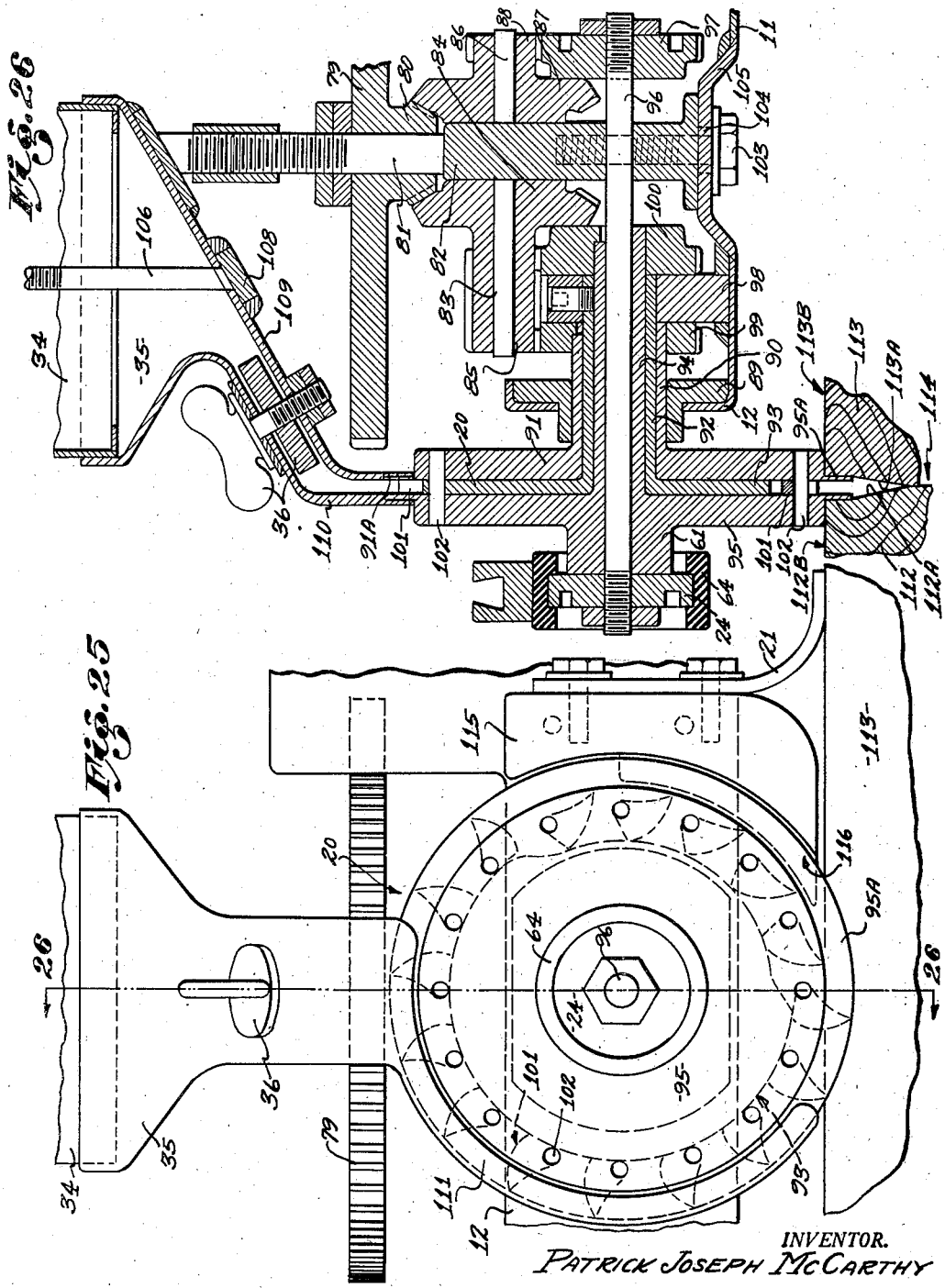

Feb. 5, 1946. P. J. McCARTHY 2,394,088
TOOL AND TOOL-SERVING MEANS FOR WORKING ON SEAMS BETWEEN PLANKS
Filed Feb. 8, 1943 9 Sheets-Sheet 9

INVENTOR
PATRICK JOSEPH McCARTHY
BY Nicholas Ripper
AGENT

Patented Feb. 5, 1946

2,394,088

UNITED STATES PATENT OFFICE 2,394,088

TOOL AND TOOL-SERVING MEANS FOR WORKING ON SEAMS BETWEEN PLANKS

Patrick Joseph McCarthy, Los Angeles, Calif.

Application February 8, 1943, Serial No. 475,220

9 Claims. (Cl. 114—224)

This invention relates to tools and tool-serving means for working on wooden planks contributively constituting large structures, such as large and small watercraft, floating drydocks, landing barges, freight cars, grain barges and otherwise, the specific parts embodying the wooden planks being, for example, the sides, bottoms and decks of watercraft and the like or the interior walls of freight cars and grain barges and the like.

Specifically, the invention relates to the transforming and enlarging of the original seams between planks into enlarged seams having a uniform cross-sectional form, and to the thereupon calking and puttying of the enlarged and transformed seams, the various operations being performed by tools that are mounted in partly or completely automatic machines.

An important object and advantage is the saving effected in time and in cost.

Another object and advantage is the applicability of unskilled labor.

Still another object and advantage and one that is of considerable importance is the entirely uniform quality of the calking and puttying.

Briefly described, a machine or tool, as it is herein referred to also, carrying the individual tools for progressively performing the various operations, is caused to travel parallelwise with the seam, the directional control thereof deriving from the coacting with the seam of a guide in the tool, a seam-penetrating part of the guide moving within the seam, the individual tools being mounted in a manner whereby their transit along the seam is conditioned by the seam-parallel movement of the tool. The penetration of said guide-part into the seam results from the reactive force that derives from the oppositely directed pressure on the part of a rail-contactor that is mounted in the tool against a rail disposed parallel with the seam and specifically against that surface of the rail that confronts the seam. Alternatively said penetration may result from the isodirectional force exerted thru gravity if the tool is made heavy enough and is being used on a substantially horizontal object, such as, for example, the deck of a ship. In the first example, the rail or its equivalent, together with whatever means are employed for holding it at a specified distance from the seam, is referred to herein as the tool-serving means. In the second example, the tool-serving means is constituted of the otherwise unnecessary augmentation in the weight or mass of the tool itself exerting the necessary gravitational force.

A tool embodying the instant invention may include only a guide and a seam-enlarger, otherwise referred to herein as a seam-transformer or as a seam-conditioner. Alternatively, the tool may include only a guide and an oakum-handling means, or a guide and a putty-handling means, or a guide and both an oakum-handling means and a putty-handling means, or a guide and a seam-conditioner and an oakum-handling means.

To set forth the nature of the invention conveniently and briefly, I have selected a tool or machine incorporating all of the individual said tools, and one that is rail-served and fully automatic, as the subject of this specification and the herewith accompanying drawings, in which—

Figure 1 is a side elevation view of the tool as seen from laterally of the seam it is working on, that one of the two planks that constitute the seam that is nearer the observer being omitted.

Figure 2 is a diagrammatic head end elevation view of the frame of the tool and Figure 3 is a similar tail end view of the same.

Figure 4 is a plan view thereof including the rail part of the tool-serving means.

Figure 5 is a fragmentary, sectional view of certain parts in the tool as they are seen in the plane 5—5 indicated in Figure 4.

Figure 6 is a fragmentary, sectional view of certain other parts in the tool as seen in the plane 6—6 indicated in Figure 4.

Figure 7 is a diagrammatic end elevation view of the tool and the tool-serving means.

Figure 8 is a plan view of one of the brackets contributively constituting the tool-serving means.

Figure 9 is an end view of the same, showing its rail-holding function.

Figure 10 is a side view of the same.

Figure 11 is a side view of a plank-contactor that is part of the tool.

Figure 12 is an end view of the same.

Figure 13 is a sectional view of the parts in the same as seen in plane 13—13 indicated in Figure 11.

Figure 14 is a sectional view of the parts in the same as seen in plane 14—14 indicated in Figure 11.

Figure 15 is a side elevation view of a guide constituting a part of the tool.

Figure 16 is a partly sectional plan view of the same.

Figure 17 is a sectional view of the same as seen in plane 17—17 indicated in Figure 15.

Figure 18 is a side elevation view of a seam-conditioner in the tool.

Figure 19 is a sectional view of the same as seen in plane 19—19 in Figure 18.

Figure 20 is a sectional view of the same as seen in the series of mutually offset planes 20—20 indicated in Figure 18.

Figure 21 is a side elevation view of an oakum-handling means constituting a part of the tool.

Figure 22 is a plan view of the same.

Figure 23 is a sectional view of the same as seen in plane 23—23 indicated in Figure 21.

Figure 24 is a sectional view of the same as seen in plane 24—24 indicated in Figure 21.

Figure 25 is an elevation view of a putty-depositing means in the tool.

Figure 26 is a sectional view of the same as seen in plane 26—26 indicated in Figure 25.

Figure 27 is a sectional view of the seam showing the compressed oakum and the putty, as well as a fragmentary view of a certain adjoining member.

Figure 28:
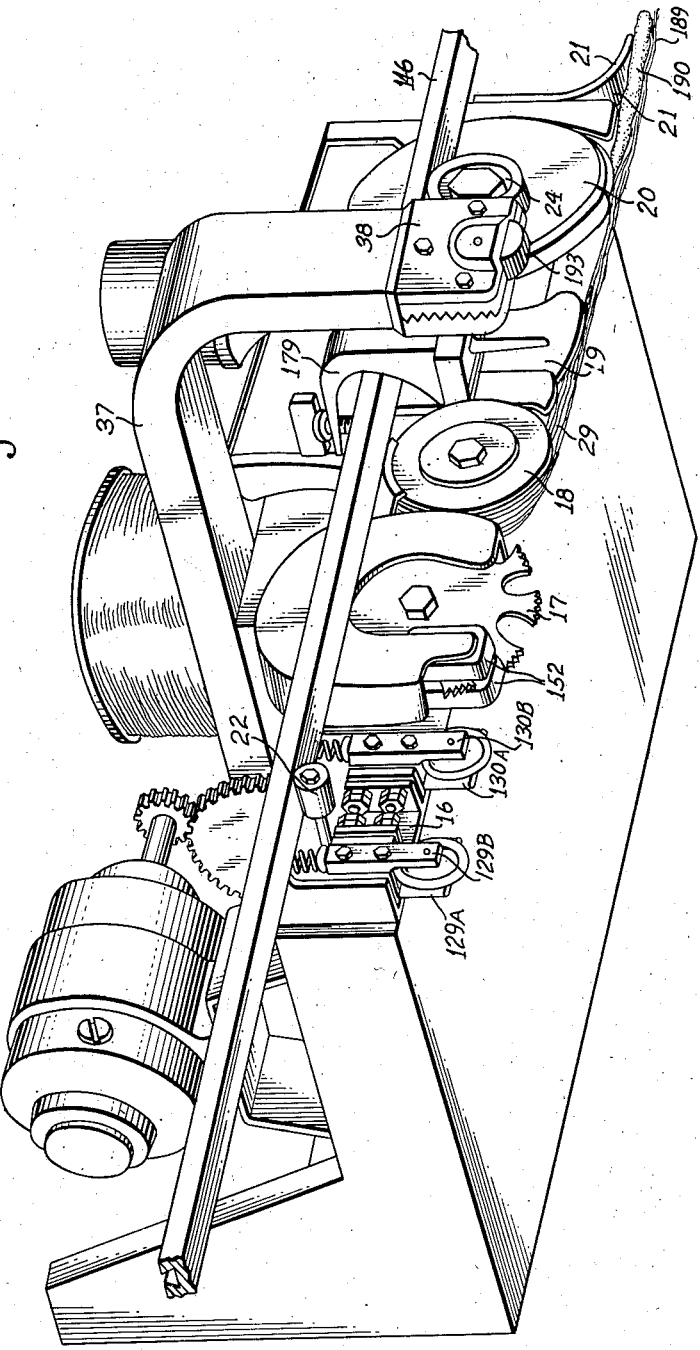
Figure 28 is a modified isometric view of the tool as seen from the plankward side thereof but with the planks removed from the view.

The frame 10 of the tool is formed from a metal sheet suitably cut and flanged. Frame 10 consists of floor 11, working wall 12, opposed wall 13, head end wall 14 and tail end wall 15.

Mounted on working wall 12 is a guide 16, and, successively mounted behind it on wall 12, are the circular saw or seam-conditioner 17, the primary oakum-handling or oakum-depositing means 18, the secondary oakum-handling means or hammer 19, the putty-depositing means 20 and the finisher 21. Refer to Figures 1, 2, 3 and 4.

Mounted at a locus adjacent and symmetrical of guide 16 is the head rail-contactor 22 and at a locus adjacent the tail end of the tool, on a solid shaft 96, concentric with certain hollow shafts contributively constituting putty-depositing means 20, is the tail rail-contactor or traction wheel 24.

Floor 11 supports a platform 25, to which is secured electric motor 26, whose shaft mounts pinion gear 27.

A reel 28 for oakum 29, which term is to be interpreted in its broadest sense to include any and all types of fibrous material suitable for calking purposes, is mounted on spindle 31 and secured thereto by nuts 30, under which is the friction washer 32. Thru the tubular conduit 33, oakum passes from reel 28 to primary oakum-handling means 18.

Underneath and to a putty reservoir 34, is secured hopper 35, in whose throat is butterfly valve 36, for controlling the rate at which putty passes from the reservoir to putty-depositing means 20. A hollow arm 37, carrying at the extremity thereof a plank-contactor 38, is rigidly secured by welding or otherwise to frame 10 and extends away therefrom at an appreciable distance from floor 11. Arm 37 is shown cross-sectionally in Figure 1 and fragmentarily in Figures 4 and 7.

Referring to Figures 1, 4, 5 and 6, the motor pinion gear 27 drives spur gear 45, fixed to drive shaft 46, journalled in bearing assembly 41 and 42. Bearing unit 41 is welded to arm 37 underneath thereof. Bearing unit 42 is bolted to unit 41 for convenience in installation, adjustability and the like. Also welded to arm 37 underneath thereof are the bearing units 39 and 43, the thereto bolted complementary bearing units being 40 and 44 respectively. Bearing assembly 43 and 44 journals countershaft 48.

Bearing unit 49 is fixed to floor 11 and the complementary bearing unit 50 is bolted to unit 49 to constitute bearing assembly 49 and 50, journalling countershaft 51, to which at one end thereof is fixed the bevel gear 53, driven by bevel pinion 52, fixed to driveshaft 46. To the opposite end of countershaft 51 there is fixed the spur gear 54, driving idler spur gear 55, fixed to idler shaft 58 and driving small spur gear 56, fixed to sawshaft 57, to which is secured the circular saw 17. Bearing assembly 49 and 50 journals also shaft 58 and sawshaft 57.

Referring to Figures 1, 4, 6, 25 and 26, driveshaft 46, thru bevel pinion 59, also drives countershafts 47 and 48 thru bevel gears 63 and 62 respectively. To the other end of countershaft 48 is fixed the spur pinion 65, driving idler gear 66, mounted on idler shaft 67, driving spur gear 68, fixed to hammer shaft 69, shafts 67 and 69 also being journalled in bearing assembly 43 and 44.

Countershaft 47 mounts, at its opposite end, bevel pinion 70, driving bevel gear 71, fixed to shaft 72, which also mounts spur gear 73, driving spur gear 74, mounted on shaft 75, driving compound gear part 76, mounted on shaft 77, the thereto complementary gear part 78 driving gear part 79, integral with bevel pinion part 80 and mounted on spindle 81, which is rigidly secured to column 82. Shafts 72, 75 and 77 are journalled in bearing 60.

There is secured to column 82 also spindle 83, mounting bevel gear part 84, integral with spur gear part 85, and spindle 86, mounting bevel gear part 87, integral with spur gear part 88.

Working wall 12 carries bearing 89, journalling the hollow shaft 90, integral with primary disc 91. Shaft 90 in turn journals hollow shaft 92, integral with cam 93. Shaft 92 in turn journals hollow shaft 94, integral with secondary disc 95 and with hub 61. Hollow shaft 94 in turn journals solid traction shaft 96, to which is fixed at one end thereof the tail rail-contactor or traction wheel 24, spur gear 97 being secured to the opposite end of shaft 96. Wheel 24 is provided with a rim 64 of rubber or other suitable material for traction.

Welded to floor 11 is bracket 98, to which hollow shaft 92 is rigidly secured, bracket 98 functioning as the center for all end adjustments along shaft 96.

Spur gears 99 and 100 are respectively fixed to hollow shafts 90 and 94 and are driven by spur gear part 85. Spur gear part 88 drives spur gear 97.

The gears and other parts in this assembly are adapted to exert and receive end or axial thrust on and from one another by being provided with smooth sides, which is manifest from the views and from the following description of the order in which the various parts hereat are assembled.

With column 82 not yet installed, the cam 93 and the two thereat flanking discs 91 and 95 are preliminarily grouped together in a sub-assembly, including the pivoting scoops 101, whose pairs of stub axles are either secured to them by sweat-fits or otherwise or are integral with them. The scoops need no nuts or other locking devices terminating the axle ends. They are held in place by their disposition between the thereto snugly flanking discs 91 and 95. Bearing 89 is installed and spur gear 99 temporarily coaxially alined between standard 98 and bearing 89 in a manner whereby the sub-assembly of discs 91 and 95, cam 93 and scoops can thereupon be installed as they appear in the views. A temporary assembling clamp is applied to embrace secondary disc 95 and bearing 89, thereby retaining the therebetween disposed other parts. If desired, a coil spring can have been previously thereto installed to intervene between disc 91 and the thereat adjacent part of working wall 12 to press disc 91 consistently against the cam 93. Gear 100 is thereupon slipped onto hollow shaft 94, no device other than a key and keyway therebetween being necessary to provide co-rotation, because of the faying of the various parts with one another as shown. Column 82, mounting compound gears 84, 85 and 87, 88, is then installed and bolt 103 is provisionally permitted to remain screwed in only partly so that column 82 is enabled to "float" until after the final adjustments for end thrust shall have been effected.

Traction wheel 24 is then locked to shaft 96 and the latter is then installed as shown and spur gear 97 is mounted and locked to shaft 96 sufficiently to produce snugly faying mutual relationships between the various members successively, whereupon bolt 103 may be screwed in completely to rigidly secure column 82 to the frame. The temporary clamp may then be removed and compound gear 79 and 80 installed as shown. Wheel 24 and gear 97 are provided with holes to serve a spanner wrench thereby being adapted to function like one of two locknuts together with their respectively adjoining nuts.

The enlarged hole in the subfloor 105, permitting the "floating" of column 82 previously to the locking thereof after final end adjustments of the various parts along shaft 96, is indicated by 104.

With its head 108 welded to base wall 109 of hopper 35, the bolt 106, extending thru reservoir 34, receives wingnut 107 to bear against an axially movable disc, not shown in the views, which in turn presses on the thereunderlying putty for the purpose of forcing it out of the reservoir and into the hopper. Obviously, persons skilled in the art can substitute, for this hand-operated method of forcing the putty out of the reservoir, automatically operated members.

Base wall 109 and thereto opposed wall 110 of hopper 35 terminate, at the exit of the hopper, in an arcuated apron 111, whose function it is to aid scoops 101 in their function of retaining as well as transposing their respective masses of putty extracted by them from the hopper exit.

At the hopper exit, the two wall sections constituting the juncture of the hopper and the apron embrace the therebetween progressively moving, successive sections of the marginal or flange portions 95A and 91A of the discs 95 and 91 respectively, just as they are embraced, though at closer mutual disposition, by the two "edges" 112A and 113A of the two planks 112 and 113 respectively. When the discs are rotated under power, the scoops sweep respectively individual masses of putty out of the hopper exit, carry them around the cam 93, which is adapted to cause the bottommost scoops to pack the therefrom deposited putty tightly into the seam 114, defined by said two "edges."

Secured to working wall 12 is the bracket 115, a headwardly extending, therewith integral part 116 functioning as a scraper for scraping off any putty masses that may tend to continue revolving around and back to the hopper exit. Bracket 115 also supports finisher 21, consisting of a flat spring, forced, by the oppositely directed or railward force exerted upon the rail by the tail end rail-contactor or traction wheel, into the arcuated position visible in Figures 1 and 25. Finisher 21 progressively presses tightly on the planks adjacent the seam and thereby smoothingly finishes the deposited putty, rendering its surface flush with the thereto adjoining exterior surfaces 112B and 113B of planks 112 and 113 or slightly recessed relatively thereto. To facilitate the views of the various parts, the deposited oakum and putty are omitted from most of the views. See Figure 27.

Referring to Figures 15, 16 and 17, the guide frame 117 is welded or otherwise secured to working wall 12 at main wall 118 of said guide frame. Outer frame walls 119 and 120 are gibbed and inner frame walls 121 and 122 are provided with threaded holes to receive therethru the stud bolts 123, 125 and 124, 126 respectively, which in turn are welded to adjustable gib units 127 and 128 respectively. The wheel-mounts 129 and 130, mounting wheels 241 and 242, are gibbed between outer wall 119 and gib unit 127 and between outer wall 120 and gib unit 128, respectively, the directly gibbed parts in said mounts being the major members 129A and 130A respectively, the respective minor members 129B and 130B complementarily constituting the mounts and being adapted to adjustability. Canopy walls 131 and 132 are respectively provided with therein secured cups 133 and 134, internally helically threaded to receive coil springs 135 and 136, which are threaded also into internally helically threaded cups 137 and 138, secured to wheel-mounts 129 and 130, respectively. The oblique setscrews 139 and 140 prevent dislodgement of the two springs from the cups.

Wheels 241 and 242 are provided with rims that are thin enough to penetrate at least for a short distance into any seam. As can be seen, each wheel and its mount are sprung independently of the other so that, when the tool, in the course of its general translational movement passes from one plank end to a successive plank end with a differentially dimensioned seam and when one wheel is still in the first seam and the other wheel is at the second or new seam, each will notwithstanding effect the deepest possible penetration conditioned by the width of the respective seam. Because of this independent springing of the two wheels therefore the combined seam-penetrating contact of the guide as a whole is preserved thereby assuring the continued seam-parallel transit of the tool even while traversing such a juncture.

The substitution, for the two wheels, of two independently sprung, non-rotating units or slides, or of one such non-rotating unit for one of the two wheels, would be an alternative, mechanically equivalent expedient that some may wish to resort to. It is not believed that so simple and easily envisaged substitution requires a separate illustration thereof.

The two wheels are shown when at deepest penetration, in which circumstance the bottom margins of members 129A, 129B and 130A and 130B contact the exterior surfaces of planks 112 and 113 and restrain the seam-penetrating parts of the guide from any inordinant penetration into the seam in these rare instances when the arbitrarily pre-indicated maximum width of seam happens to be exceeded.

To each wheel there is firmly secured a pair of tapered stub-axles, which of course may be integral with the wheel instead, the stub-axle, in the case of wheel 242, being indicated by 242A. The stub-axles are journalled in correspondingly tapered holes in the wheel-mount units, a shim 148 being interposed for adjustability.

Centrally and adjoining the canopy walls 131 and 132, the main wall 118 is notched to accommodate the disposition thereat of the resilient wheel-mount 141, which is constituted of a flat spring whose end has been annealed and ground or machined to constitute a stub-axle 142, which is threaded and supports the wheel or head rail-contactor 22. Spring 141 is fixed by a bolt 144 on a bracket 145, welded or otherwise secured to the frame 10. The various parts are adapted to condition a plankward bending of the spring 141, whereby a railwardly directed force is exerted thru wheel 22 against that working surface 146A of the rail which confronts and is spaced from exterior surface 112B of plank 112.

Referring to Figures 18, 19 and 20, the seam-conditioner, which in this embodiment takes the form of a circular saw instead of, for example, a milling type of cutter, is indicated by 17. It is mounted on shaft 57 and its guard 148 is secured to working wall 12 by the three bolts 149, 150 and 151. Bolt 151 also has the function of contributively rigidly securing a block 152, made of wood, additionally secured by screws 153 and 154. One function of block 152 is that of a barrier against the tendency of chips flying out of the cut to continue around inside of guard 148 and to be deposited in the enlarged or conditioned seam 114 in back of the saw; see Figure 20. The original seam, which has been enlarged and transformed to constitute conditioned seam 114 is indicated by 114X. The direction of rotation of the saw is indicated by arrow 155. The other function of block 152 is to bear forcibly down onto the seam-adjoining portions of the planks adjoining the exit locus for the saw, thereby appreciably restraining the plank fibers thereat from tearing loose correspondingly with the movement of the saw teeth. In this way, clean smooth edges are assured for the conditioned seam. Block 152 accommodates saw 17 with a degree of clearance that effectively restrains chips from passing therealong and yet spaced sufficiently from saw 17 to avoid the generation of heat in the block. Sawshaft 57 is journalled in bearing 156, retained in bearing plate 157 in back of wall 12.

Referring to Figures 21, 22, 23 and 24, the oakum-depositing or primary oakum-handling means 18 includes, secured to working wall 12, a dead stub-axle 158 mounting a core 159, perforated to receive therethru axle 158. Axle 158 also mounts the two cuplike members 160 and 161, flanking the core and also perforated to receive axle 158 therethru but with so great a degree of clearance as to adapt the cuplike members to disposability thereof into mean radial planes that are oblique to axle 158. The members 160 and 161 each have the form of a cross-sectionally circular cup, whose body portions are respectively indicated by 160A and 161A and are provided with external, annular, respective flange portions 160B and 161B along the edges of the body portions. The concave sides of the body portions confront the core.

Around axle 158 and between body portions 160A and 161A is a compression coil spring 162, whose function it is to force the two cuplike members away from one another as far as the restraining forces exerted upon them by the relatively narrow space of seam 114 and by the relatively wide interior space of apron 163 permit. The locus of said narrow space adjoining seam 114 is referred to as the secondary locus and that of said wide space adjacent apron 163, which is that of the greatest possible distance from the seam, is referred to as the primary locus.

The reel is mounted in a manner whereby it rotates to yield its oakum in response to the pull exerted thereon by means 18 thru the tubular conduit 33 but under sufficient restraint on the part of a friction washer to prevent spinning under momentum. A given small mass of oakum, passing thru apron 163, disposes itself in the wide space at the primary locus and, in the course of gradual transition and reduction of said space until it has arrived at said secondary locus, has become correspondingly gradually compressed, so much so, that, pressing outwardly therefrom in opposite directions onto the interior surfaces of the thereto adjoining pair of sections of the flange portions 160B and 161B, this pressure becomes translated into a frictional relationship between said sections, on the one hand, and the "edges," on the other hand. This frictional relationship is so pronounced that the general movement of the tool generates a corresponding amount of revolving movement in the successive pairs of sections of said flange portions, thereby inducing rotation of the two cuplike members. By this expedient, the otherwise necessary employment of power from a motor for rotating the cuplike members can be and is dispensed with. Alternatively the compression spring can be substituted by exteriorly disposed tension springs or by eliminating springs altogether and providing the interior surface of the canopy wall of apron 163 with two grooves for conducting the therethru passing edges of the two flange portions.

Immediately in back of primary oakum-handling means 18 and bolted to working wall 12 is the secondary oakum-handling means or hammer 19, which includes the frame 164 and the hammer 165 adapted to reciprocate rapidly therein. Hammer 165 includes a slide section 166, a boot section 167 and an arm section 168, all integral with one another. Directly gibbed to the boot section and indirectly to the arm section thru the medium of the adjustable gib unit 169 is the laterally and seamwardly reciprocating member 170, journalling the eccentric cam 171, preferably integral with hammer shaft 69. Hammer shaft 69 is journalled in bearing 172, its end thrust being received by bearing assembly 43 and 44, in which the conical end of shaft 69 is received. Bearing 172 is supported by a felt cushion 173. Bearing 172 is restrained against dislodgement laterally or away from wall 12 by U-shaped frame 174 and is pressed down onto cushion 173 by flat spring 175, secured to and extending from pivotable detent 176, upon which bolt 177 bears for adjustment of the tension of spring 175. Slide section 166 is gibbed to frame 164 by means of primary wall 164A and by adjustable gib 202, controlled by bolts thru secondary wall 164B thereof.

Secured to or preferably integral with and extending headwardly from frame 164 is the tongue or transferring means 178, the tip of which is disposed between flange portions 160B and 161B and contacting core 159. The function of tongue 178 is to help dislodge the compressed and therefore more or less tenacious masses of oakum and thereby facilitate the lodgment of the masses inside of the seam.

In the retracted position, the headward end of seamwardmost margin 167A of heel 167 is slightly outside of the seam for about one-third of its distance of reciprocation, whereas the tailward end of margin 167A is flanked by the two "edges" of the seam under both extreme positions of reciprocation. In this way, the margin penetrates seam 114 for more or less of a distance, thereby rendering unlikely the accidental dislodgment or displacement of the hammer out of its designed isolineal path with seam 114. The relatively great length of the oakum-contacting or marginal part 167A of the heel, combined with its slight obliquity, permits a desirable short reciprocation and assures a smoothly operating, sure and effective compression of the oakum that is introduced previously thereto in a partly compressed state by the primary oakum-handling means 18. The seam-adjoining margin 164C of frame 164 is wider than the seam and fays with the seam-adjoining sections of the exterior surfaces 112B and 113B thereat, thereby contributively retaining the partly compressed oakum within the seam preparatorily to compressing it further by the hammer.

Referring to Figure 7: The letter P designates the primary line of transit and progressive pressure determined by the transit along and pressure on working surface 146A of rail 146 by head rail-contactor 22 and tail rail-contactor or traction wheel 24. The letter S designates the secondary line of transit and progressive pressure determined by the transit along and pressure on and progressive operations on the seam between planks 112 and 113 by the guide and the various work-performing means of the tool, as already previously described. The letter T designates the tertiary line of transit and progressive pressure determined by the transit on plank 112 along a path spaced from the seam by plank-contactor 38, specifically wheel 193 thereof.

It is to be noted that those planes of the primary, secondary and tertiary lines of transit that are normal to the planes of the exterior or of the interior surfaces of the planks and that are parallel with the seam and which may be respectively referred to as the primary, secondary and tertiary planes, are related to one another in a manner whereby the secondary and tertiary planes flank the primary plane. Also to be noted is that the plankwardly directed forces exerted by the guide and the various work-performing means at the secondary line of transit and by the wheel 193 at the tertiary line of transit are both opposed to the railwardly directed force exerted on rail 146 by parts 22 and 24.

Because head rail-contactor 22 exerts pressure on rail 146 resiliently, the thereto corresponding or primary line of transit is a substantially resilient line of progressive pressure. The non-resilient mounting of block 152 (see Figure 18) and of frame 164 (see Figures 21, 22 and particularly 23) determine the non-resilient nature of the thereto corresponding or secondary line of transit and progressive pressure. The line of pressure corresponding to wheel 193 is a non-resilient one because the mount 38 is a rigid one. If, however, a leaf-type of spring be substituted for arm 37, even the tertiary line of pressure may, if desired, be transformed into a resilient line of pressure. In any event, we are assured of the necessary desideratum of at least one out of three lines of transit and progressive pressure being a resilient one to accommodate irregularities of dispositions between the planes of the surfaces of the planks or between either one or both of them and the rail. The primary line of transit may be made completely resilient by disposing shaft 96 of traction wheel 24 resiliently and outside of instead of concentric with the shafts of the putty-depositing means. The mutually opposed forces of the primary line on the one hand and of the secondary and tertiary lines on the other hand and the flanking of the primary plane by the secondary and tertiary planes make it possible to operate the tool in an inverted position underneath the bottom of a hull or in a lateral position when working on the side of one.

Reverting to Figures 7, 8, 9, 10 and 27, we see one of the brackets, 179, functioning as a rail-holding means. It is contributively constituted of a major base section 180 and a thereto complementary, thereto pinned and bolted minor base section 181. Section 181 is provided with two tongue-like sections 181A and 181B, which together define slot 183 and which taper in elevation view in addition to the tapered form of the slot 183, which is alternatively referred to as a receiving means. An arm section, extending upwardly from and preferably integral with major base section 180, is indicated by 212.

The structure containing the planks also includes the adjoining member 182, adjoining the two mutually corresponding interior surfaces 112C and 113C of the two planks. See Figure 27. If the structure in question be the hull of a wooden ship, the adjoining member 182 is conceivably a wooden rib, to which the planks 112 and 113 would be secured by pluralities of thru-detents consisting of the conventional boat nails, also referred to herein as fasteners. If the structure in question be the hull of a steel-framed grain barge, lined interiorly thereof with wooden planks, the adjoining member would conceivably be one of the steel frame members and the wooden planks would be secured thereto by bolts screwing into threaded holes in the steel frame member. For this and other reasons, I therefore prefer to employ the more generic terms, fasteners.

Some of the nails are employed as temporary holding means for the brackets, and are referred to herein as selected fasteners. One of such fasteners or, in this example, nails, is indicated by 184. As in the case of the other nails functioning as fasteners that provisionally hold the brackets, nail 184 is shown as having been provisionally driven or inserted thru plank 112 but only incompletely into rib or adjoining member 182, but sufficiently far to obtain a very high degree of retentiveness for the nail. Besides the head, an appreciable part of the shank protrudes outside of the exterior surface of plank 112 and is thereby adapted to be received by and to retain bracket 179. A spacing jig is laid on the plank and the thickness of the jig conditions the length of the protruding shank portion of the nail 184 when it is driven in to the position where the nail head contacts the jig. The length of the protruding shank portion is slightly less than the maximum thickness of the two tongues 181A and 181B. When the bracket is disposed adjacent the nail, and part 180A of the bracket is hammered to force it into engagement with nail 184, the bracket is strongly retained thereby. To remove the bracket it is then hammered in the opposite direction at hammer-contacting area 180B thereof. A plurality of such brackets is employed as a rail-holding means.

The rail is provided with a slot 185 of cross-sectionally trapezoidal form to receive the correspondingly formed head 186 of a securing bolt 187, tightened by wingnuts 188. The brackets are thus rendered slidable relatively to one another along the rail for unrestrained disposability of the brackets at suitable loci. In Figure 8, the rail is omitted from the view.

In Figure 27, the compressed oakum and the putty are respectively indicated by 189 and 190.

Referring to Figures 11, 12, 13 and 14, the arm 37 terminates in and has welded to it the wheeled plank-contactor 38, including a welded member 191, a primary unit 198 and a secondary unit 192, both functioning as a bearing for the wheel 193. A shim 194 is disposed between the two units to provide adjustability against wear. The mutually contacting surfaces of welded member 191 and primary unit 198 are correspondingly serrated to provide adjustability for suitable contacting of the planks by wheel 193. The two units and the welded member are secured to one another by three bolts, 195, 196 and 197, accommodated by elongated, respective slots 200, 199 and 201, see Figures 11 and 12.

When the tool is operating on the deck of a ship's hull, it is supported by block 152 (see Figure 18) and by the heel portions of frame 164 (see Figures 21, 22 and particularly 23), sliding along on the "edge"-adjoining margins of planks 112 and 113, straddling the seam of course, and by wheel 193 of plank-contactor 38 riding on the exterior surface 112B of plank 112. No other supporting means is provided for, as, per example, wheels underneath opposed wall 13 of the frame. This omission is a deliberate one for two reasons; one is to retain the principle of only three lines of progressive pressure; the other is to utilize the laterally extending mass for augmenting the penetration of the seam by the guide, in turn to assure a consistent following of the seam by the guide. When the tool is operated in an inverted position underneath the bottom of a ship's hull, the tool is supported by the rail 146 through head rail-contactor 22 and tail rail-contactor or traction wheel 24. When the tool is operated in a lateral position on the side of a ship's hull, it is supported by the seam, penetrated as it is by the guide and by the boot section 167 of hammer 165 and by the flange portions 160B and 161B of cup-like members 160 and 161 of the oakum-depositing means and by the teeth of the saw or seam-enlarger 17 and by the marginal portions of the discs 91 and 95 of the putty-depositing means. To relieve these various parts of part of the bending strain imposed upon them in this disposition of the tool, the latter's weight may be counterbalanced at least partly in any one of a number of obvious and familiar ways.

Should neither the force of gravity nor a rail be desired as a tool-serving means, the equivalent of a rail in the form of relatively wide objects substantially parallel with the seam can be adopted. I have in mind, in the case of calking the sides of a ship's hull, wooden planking constituting part of the scaffolding adjacent the hull; suitable, obvious types of intervening devices between the tool and such wooden planking can be used for setting up the necessary mutually directionally opposed forces for conditioning adequate penetration into the seam on the part of the guide.

The term, "edges," as employed herein within quotation marks, is employed in the colloquial sense to indicate the narrow sides of the planks and not in the geometrical sense of indicating the juncture of two surfaces regardless of the difference between their areas. When employed without quotation marks herein, the term is used in the strict geometrical sense.

Instead of using a spacing jig for inserting the selected thru-detents, each bracket can be deposited at the plank, whereupon the thru-detent is then provisionally incompletely inserted, in which case the detent-adjoining part of the bracket assumes the function of the jig. This method is particularly adapted to thru-detents of the bolt type.

The planks may be of plastic or otherwise instead of wood. The term, wooden, therefore is applicable to any non-metallic planks.

In the case of ship hulls and decks, generally two marginally adjacent rows of thru-detents are employed and often in mutually staggered relationship, unless the planks are quite wide, in which case three rows are occasionally used. In those instances when a longitudinally central row of thru-detents is employed, correspondingly dimensioned and perhaps even formally modified brackets are indicated. Because of curvature of the structure and other reasons, the original or unconditioned seams vary in width but rarely in excess of three-sixteenths of an inch at the exterior edges of the seams. At the interior edges of the seam, the planks usually adjoin.

The separate finishing tool or finisher 21 can be dispensed with and its function assumed at least partly if not entirely by a part similar to and perhaps modified from the bracket 115. As employed herein, the term, finisher, includes either of or both the bracket 115 and the spring 21.

Obviously, outside of the degree of penetration into the seam on the part of the guide, the amount of directional control exercised by it on the general translational movement of the tool is in direct relationship to the ratio of the guide length of penetration to the general tool length of contact. Said guide length is the distance between those two loci in the seam-penetrating parts of the guide that are furthest spaced from one another. Said general tool length of contact is the distance between the headwardmost and the tailwardmost locus of contact of the tool with the seam. In the tool described, this ratio is approximately one to seven. I regard all ratios of not less than one to thirty as falling within the scope of my invention, regardless of whether two wheels, or two slides, or one wheel and one slide or one slide alone be employed. Heretofore, a single guide wheel has been proposed for all of the heretofore unsuccessful attempts to construct an automatic calking and/or puttying tool. In all known cases, the maximum seam-penetrating length of the guide part was less than one to forty of the general tool length of contact with the seam. In my experience this ratio has been invariably inadequate for positive directional control of the tool.

I claim:

1. For working on a structure including two longitudinally adjacent and substantially parallel wooden planks and specifically on the mutual seam defined by the two respective, mutually adjacent and substantially parallel long "edges" thereof, a tool adapted to general translational movement thereof parallelwise with said seam and including a guide mounted adjacent the head of said tool and adapted to follow said seam and to thereby directionally control said general movement, and at least one work-performing means mounted between said guide and the tail end of said tool and adapted to progressively perform an operation at said seam, said work-performing means including an enlarger adapted to progressively enlarge and transform said seam into an enlarged and cross-sectionally uniform seam.

2. A tool as described in claim 1, said work-performing means including a primary oakum-handling means adapted to progressively deposit oakum into said seam and a secondary oakum-handling means adapted to progressively compress the deposited said oakum.

3. A tool as described in claim 1, said work-performing means including a primary oakum-handling means adapted to progressively deposit oakum into said seam, a secondary oakum-handling means adapted to progressively compress the deposited said oakum, a putty-depositing means adapted to progressively deposit putty into said seam and a finisher adapted to progressively finish the surface of the deposited said putty and render it flush with the thereto adjoining exterior surfaces of said planks.

4. For working on a structure including two longitudinally adjacent and substantially parallel wooden planks and specifically on the mutual seam defined by the two respective, mutually adjacent and substantially parallel long "edges" thereof, a tool adapted to general translational movement thereof parallelwise with said seam and including a guide mounted adjacent the head of said tool and adapted to follow said seam and to thereby directionally control said general movement, and work-performing means mounted between said guide and the tail end of said tool and adapted to progressively perform operations at said seam, said work-performing means including a primary oakum-handling means adapted to progressively deposit oakum into said seam and a secondary oakum-handling means adapted to progressively compress the deposited said oakum, said primary handling means including: an axle; a core having the form of a wheel and that is perforated to receive therethru said axle; two flanking cup-like members, perforated to loosely receive said axle therethru, each having the form of a cross-sectionally circular cup with an external, annular flange portion along the edge thereof, said cup-like members flanking said core in a manner whereby the concave sides of the body portions thereof confront said core, said flange portions being mutually nearer than are said body portions to one another, resilient means adapted to provide said cup-like members with axial movement away from one another, a thereupon ensuing disposition of each of said flange portions into a plane that is oblique to said axle being conditioned by the freedom of fit in the mounting of said cup-like members on said axle and by the progressive embracing and restraining of said flange portions by said "edges" and by said resilient means, said flange portions being in frictional contact with said "edges" whereby said general movement of said tool induces a rotational movement into said cuplike members, the space between any given pair of corresponding sections of said flange portions when at a primary locus of greatest possible distance from said seam appreciably exceeding the space between them when they are at a secondary locus adjoining said seam, whereby a given mass of oakum occupying said space at said primary locus becomes gradually compressed during the transition and the reduction of said space into the appreciably smaller space between them at said secondary locus, said tool including a transferring means thereat for transferring said oakum into said seam.

5. The combination of a tool and a rail and a plurality of rail-holding brackets for working on the original seam common to two mutually adjacent, substantially parallel planks secured to a structure by a plurality of nail-like fasteners, said tool being adapted to general translational movement thereof parallelwise with said seam and including a guide mounted adjacent the head of said tool and adapted to follow said seam and to thereby directionally control said general movement, and at least one work-performing means mounted between said guide and the tail end of said tool and adapted to progressively perform an operation at said seam, said work-performing means including an enlarger adapted to progressively enlarge and transform said seam into an enlarged and cross-sectionally uniform seam, said rail having a working surface confronting said planks, said brackets being adapted to being retained by the provisionally incompletely driven-in said fasteners and to holding said rail parallel with and spaced from said seam, said rail being adapted to resist the tendency of said guide to depart from said seam.

6. The combination set forth in claim 5, said tool including a work-performing means for performing at least one other operation in addition to said enlarging and transforming of said original seam.

7. The combination claimed in claim 5, said tool including a head rail-contactor resiliently mounted adjacent the head of said tool and adapted to progressively press on said working surface during said general movement, said guide being provided with at least one part thin enough to penetrate said seam during the transit of said guide along said seam, the penetration of said part into said seam being conditioned by the directionally opposed relationship between the seamwardly directed force exerted thru said guide and the railwardly directed force exerted thru said head rail-contactor.

8. The combination claimed in claim 5, said tool including a motor and a traction wheel powered thereby and adapted to progressively press on said working hurface in rotation therealong, thereby providing said general movement.

9. The combination described in claim 5, said tool including an arm extending therefrom and terminating in a plank-contacting part, said arm and part being so dimensionally and otherwise characterized as to condition a progressive contact between said part and a deck plank in said structure in a manner whereby said brackets are disposed between said tool and the loci of said progressive contact.

PATRICK JOSEPH McCARTHY.